(12) United States Patent
Kawamori et al.

(10) Patent No.: US 11,465,183 B2
(45) Date of Patent: Oct. 11, 2022

(54) CLEANING APPARATUS AND CLEANING METHOD

(71) Applicant: SUGINO MACHINE LIMITED, Uozu (JP)

(72) Inventors: Yoshiteru Kawamori, Novi, MI (US); Toyoaki Mitsue, Uozu (JP); Takuya Kanemoto, Uozu (JP)

(73) Assignee: SUGINO MACHINE LIMITED, Uozu (JP)

( * ) Notice: Subject to any disclaimer, the term of this patent is extended or adjusted under 35 U.S.C. 154(b) by 2 days.

(21) Appl. No.: 17/153,430

(22) Filed: Jan. 20, 2021

(65) Prior Publication Data

US 2021/0260629 A1 Aug. 26, 2021

(30) Foreign Application Priority Data

Feb. 25, 2020 (JP) .............................. JP2020-029622

(51) Int. Cl.
*B08B 3/02* (2006.01)
*B08B 13/00* (2006.01)
*B25B 5/16* (2006.01)

(52) U.S. Cl.
CPC .............. *B08B 3/02* (2013.01); *B08B 13/00* (2013.01); *B25B 5/16* (2013.01)

(58) Field of Classification Search
CPC .. B08B 3/02; B08B 13/00; B08B 9/00; B08B 5/02; B08B 3/022; B08B 3/024; B25B 5/16; B23Q 11/0075; B05B 1/14; B05B 13/0278; B05B 15/55

See application file for complete search history.

(56) References Cited

U.S. PATENT DOCUMENTS

| 4,960,142 A | 10/1990 | Robb et al. |
| 2007/0277930 A1* | 12/2007 | Yokoyama ........ H01L 21/67051 |
| | | 156/345.31 |
| 2017/0252928 A1* | 9/2017 | Fukurotani .......... B25J 19/0075 |

FOREIGN PATENT DOCUMENTS

| DE | 102006002129 A1 | 7/2007 |
| JP | H2-78242 U | 6/1990 |
| JP | 2005-051094 A | 2/2005 |
| JP | 2009-136756 A | 6/2009 |
| JP | 2018-69203 A | 5/2018 |
| JP | 6502878 B | 4/2019 |
| WO | WO-2018088102 A1 * | 5/2018 ............... B08B 3/02 |

OTHER PUBLICATIONS

Machine translation of WO-2018088102-A1 (Year: 2018).*

(Continued)

*Primary Examiner* — Erin F Bergner
(74) *Attorney, Agent, or Firm* — United IP Counselors, LLC

(57) ABSTRACT

Provided is a cleaning apparatus for cleaning a portion where a seating pad contacts or a hole into which a pin is inserted when a workpiece is placed. The cleaning apparatus for cleaning a workpiece having a placing portion and a reference hole, including: a table plate, a seating pad on which the workpiece is placed at the placing portion, a first nozzle that ejects a cleaning fluid, a pin inserted into the reference hole, and a second nozzle that ejects the cleaning fluid toward inside of the reference hole.

13 Claims, 9 Drawing Sheets

(56) References Cited

OTHER PUBLICATIONS

"General-purpose high-efficiency cleaning system JCC series Jet Clean Center Series", Catalog No. Q2426, issued Sep. 2017, by Sugino Machine Ltd., Uozu City, Toyama Prefecture, Japan.
Office Action dated Oct. 6, 2020 in a corresponding Japanese patent application No. 2020-029622.
Extended European Search Report dated Jun. 17, 2021 in a corresponding European patent application No. 21150199.4 (10 pages).

\* cited by examiner

CLEANING APPARATUS AND CLEANING METHOD

CROSS-REFERENCE TO RELATED APPLICATIONS

This application claims the benefit of priority to Japanese Patent Application No. 2020-029622, filed on Feb. 25, 2020, the entire contents of which are hereby incorporated by reference.

BACKGROUND

1. Technical Field

The present invention relates to a cleaning apparatus and a cleaning method.

2. Description of the Background

A table or hand having a seating pad, pins, and clamps is used for a jet cleaning apparatus for cleaning a workpiece by ejecting a jet of cleaning liquid (for example, Catalog No. Q2426 "General-purpose high-efficiency cleaning system JCC series Jet Clean Center Series" issued by Sugino Machine Ltd., Japanese Patent No. 6502878).

BRIEF SUMMARY

When the jet cleaning apparatus cleans the workpiece placed on the table, the jet cleaning apparatus cannot clean the portion where the seating pad contacts or the hole into which the pin is inserted. Therefore, foreign matter may remain in these portions.

An object of the present invention is to provide a cleaning apparatus and a cleaning method capable of cleaning a portion where a seating pad contacts or a hole into which a pin is inserted when a workpiece is placed.

A first aspect of the present invention is a cleaning apparatus for cleaning a workpiece having a placing portion and a reference hole, the cleaning apparatus including:
a table plate;
a seating pad disposed on the table plate, the workpiece configured to be placed on the seating pad at the placing portion;
a first nozzle disposed on the table plate, the first nozzle configured to eject a cleaning fluid toward the placing portion;
a pin disposed on the table plate, the pin configured to be inserted into the reference hole; and
a second nozzle disposed on the table plate, the second nozzle configured to eject the cleaning fluid toward inside of the reference hole.

A second aspect of the present invention is a cleaning apparatus for cleaning a workpiece having a placing portion, the cleaning apparatus including:
a table plate;
a seating pad disposed on the table plate, the workpiece configured to be placed on the seating pad at the placing portion;
a clamp disposed on the table plate, the clamp including a clamp arm configured to contact a clamp portion of the workpiece, the clamp configured to fix the workpiece;
a first nozzle disposed on the table plate, the first nozzle configured to eject a cleaning fluid toward the placing portion; and
a third nozzle configured to eject the cleaning fluid toward the clamp portion.

A third aspect of the present invention is a cleaning method, including:
moving a workpiece to a standby position where a reference hole of the workpiece is positioned on an extended line of a pin and apart from a seating pad by a standby distance;
ejecting a cleaning fluid from a first nozzle toward a placing portion of the workpiece where the seating pad is to be in contact;
ejecting the cleaning fluid from a second nozzle toward the reference hole in which the pin is to be inserted;
placing the workpiece on the seating pad;
stopping the ejecting of the cleaning fluid from the first nozzle and the second nozzle; and
fixing the workpiece to a table with a clamp.

The cleaning apparatus may be a deburring machine using high pressure jet.

The cleaning fluid is, for example, a cleaning liquid, mist air, or compressed air. Preferably, the cleaning fluid is a cleaning liquid. The cleaning liquid is, for example, an aqueous cleaning liquid. The mist air is, for example, compressed air containing a cleaning liquid.

The table broadly include those that grip workpiece. For example, if the carriage moves the workpiece relative to a fixed nozzle, the table includes a hand mounted on the carriage.

The table may be rotatably or swingably mounted on a rotary table. The rotary table is numerically controlled, for example. The table may be supported at both ends on the rotary table and a support base. Preferably, the rotary table supplies the cleaning fluid or compressed air to the table by communicating the cleaning fluid or compressed air. The cleaning fluid or compressed air may be supplied to the table via the support base. Either one of the cleaning fluid and compressed air may be supplied from the rotary table to the table. The other may be supplied from the support base to the table. In this case, preferably, the rotary table and the support base have a swivel joint. The cleaning fluid and compressed air may be supplied to the table via the swivel joint.

The seating pad may include a first stem and a pad portion. When a first outlet is located on a seating surface or a shoulder of the first stem (end surface), the first outlet is located in a direction perpendicular to the seating surface.

The pin may include a second stem and an insertion portion. When the second outlet is located on a top or a shoulder of the second stem (end surface), the second outlet is located along the axial direction of the cylindrical portion. The cylindrical portion may be cut in diamond shape. The second outlet may be located on a cut surface of the cylindrical portion. If the second outlet is located in the cylindrical portion, the second outlet may be located in a direction perpendicular to the central axis of the cylindrical portion (e.g., radial direction).

The guide portion may have a tapered surface. The distal end of the guide portion may be a plane or a spherical surface. The outlet may be located on the plane or the spherical surface of the tip.

The height of the pillar (first pillar) of the third nozzle is substantially the equal to or higher than the seating pad height. Preferably, the height of the first pillar is higher than the height of the clamp portion when the workpiece is placed on the seating pad. Preferably, the height of the third outlet is higher than the height of the clamp portion when the workpiece is placed on the seating pad. Preferably, the third outlet is located such that the jet generated by the third outlet collides with the clamp portion of the workpiece when the workpiece is placed on the seating pad or when the workpiece is at the standby position.

The third outlet cleans the clamp portion. Preferably, the third outlet is located such that when the workpiece is clamped by the clamp, the jet generated by the outlet collides with a portion of the clamp arm that contacts the clamp portion, e.g., a clamp pad.

The cleaning apparatus may include a fourth nozzle for cleaning the seating pad. The fourth nozzle is located separately from the seating pad. The fourth nozzle may include a second pillar, and a fourth outlet located at the distal end of the second pillar. The height of the second pillar is substantially equal to or higher than the seating pad height. Preferably, the height of the fourth outlet is substantially the equal to or higher than the seating pad height. The fourth outlet is located at the distal end of the pillar in an oblique proximal direction.

The cleaning apparatus may include a fifth nozzle for cleaning the pin. The fifth nozzle is located separately from the pin. The fifth nozzle may include a third pillar, and a fifth outlet located at a distal end portion of the third pillar. The height of the third pillar is substantially equal to or higher than the height of the pin. Preferably, the height of the fifth outlet is substantially equal to or higher than the height of the pin. The fifth outlet is located in an oblique proximal direction. The second pillar may be integral with the third pillar.

The cleaning apparatus may include a sixth nozzle for cleaning the clamp portion. The sixth nozzle has a sixth outlet located at the distal end of the clamp arm. A pipe connecting to the sixth outlet may be arranged inside the clamp arm or the clamp shaft. The sixth outlet is located toward the clamp portion.

For example, the first nozzle, the second nozzle, the third nozzle, the fourth nozzle, the fifth nozzle and the sixth nozzle are straight jet nozzles, fan-shaped jet nozzles or conical-shaped jet nozzles.

The cleaning apparatus may have any combination of the first nozzle, the second nozzle, the third nozzle, the fourth nozzle, the fifth nozzle, and the sixth nozzle.

Preferably, the cleaning apparatus includes any one of the following; (1) a combination of the first nozzle, the second nozzle and the fourth nozzle, (2) a combination of the first nozzle, the second nozzle and the fifth nozzle, (3) a combination of the first nozzle, the third nozzle and the fourth nozzle, (4) a combination of the first nozzle, the third nozzle and the fifth nozzle, (5) a combination of the first nozzle, the second nozzle, the third nozzle, the fourth nozzle and the fifth nozzle, (6) a combination of the first nozzle, the second nozzle, and the sixth nozzle, (7) a combination of the first nozzle, the second nozzle, the fourth nozzle, and the sixth nozzle, (8) a combination of the first nozzle, the second nozzle, the third nozzle, the fourth nozzle, the fifth nozzle and the sixth nozzle.

The cleaning valve and the cleaning pipe may be a single system. When the cleaning pipe is made to be a single system, the cleaning apparatus includes a single cleaning valve and a single cleaning pipe. The single cleaning pipe is branched to be connected to the first nozzle, the second nozzle, the third nozzle, the fourth nozzle, the fifth nozzle, and the sixth nozzle, respectively.

The cleaning valve and the cleaning pipe may be a plurality of systems. For example, when the cleaning pipe is made to be two systems, the cleaning apparatus includes two cleaning valves and two cleaning pipes. The cleaning valves are connected to a cleaning fluid source. The first cleaning valve is connected to the first nozzle, the second nozzle, the fourth nozzle and the fifth nozzle. The second cleaning valve is connected to the third nozzle and the sixth nozzle.

When the cleaning pipe is made to be three systems, the cleaning apparatus further includes a third cleaning valve and a third cleaning pipe. The first cleaning valve is connected to the first nozzle and the second nozzle. The second cleaning valve is connected to the third nozzle and the sixth nozzle. The third cleaning valve is connected to the fourth nozzle and the fifth nozzle.

The fourth nozzle may stop the ejection when the workpiece comes to the standby position. The fifth nozzle may stop the ejection when the workpiece comes to the standby position. The fourth nozzle and the fifth nozzle start ejection at the same time, and may stop the ejection at the same time.

According to the cleaning apparatus and the cleaning method of the present invention, it is possible to clean a portion where the seating pad contacts or the hole into which the pin is inserted when the workpiece is placed.

DETAILED DESCRIPTION

Figure 1:
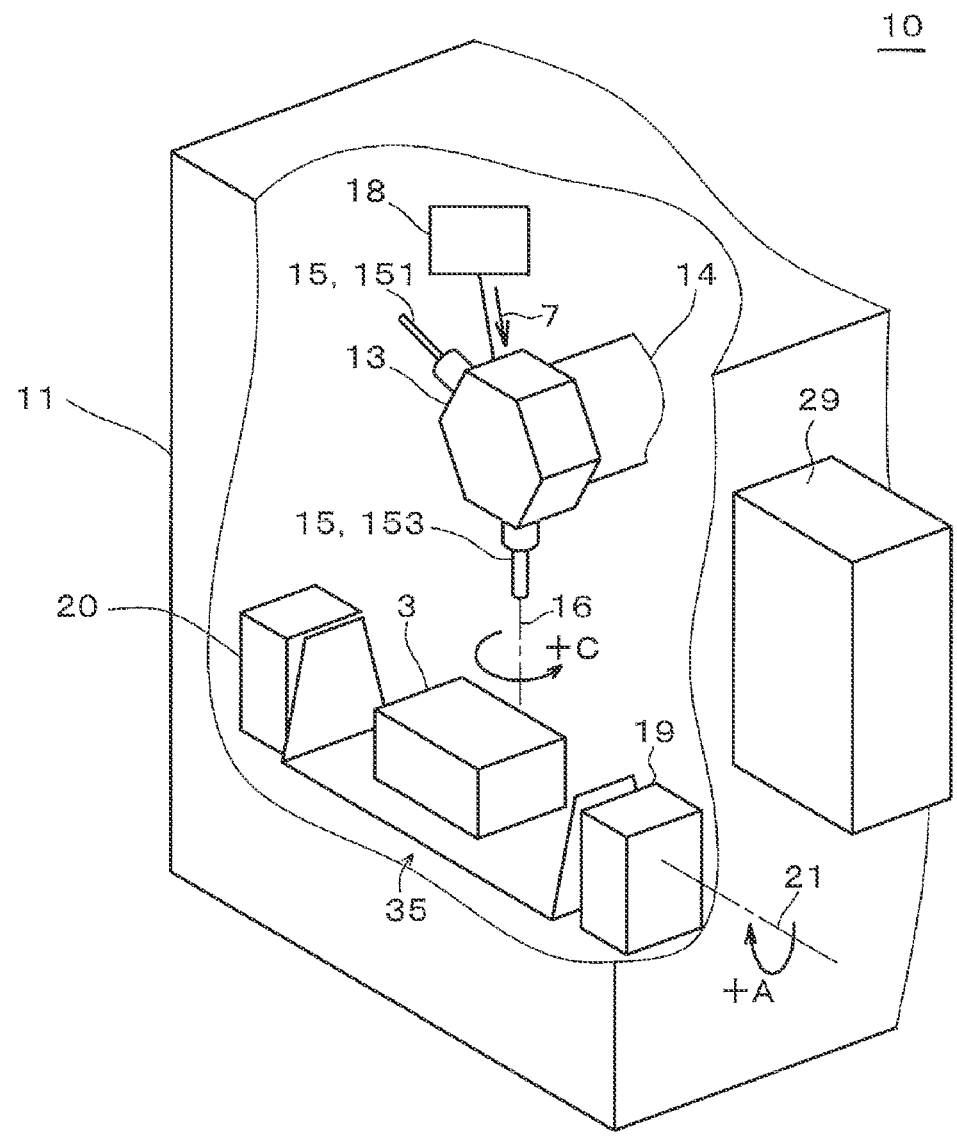
FIG. 1 is a partially cutout perspective view of a cleaning apparatus according to the embodiment.

As shown in FIG. 1, the cleaning apparatus 10 includes a cover 11, a moving device 14, a nozzle 15, a table 35, a pump 18, a rotary table 19, a support base 20, and a controller 29. The moving device 14 may include a turret 13. The cleaning apparatus 10 cleans or deburrs a workpiece 3 by colliding a jet generated from the nozzle 15 with the workpiece 3.

The pump 18 is a liquid pump such as a piston pump, a gear pump, a volute pump. The pump 18 pressurizes cleaning liquid 7 from a cleaning liquid tank (not shown) and supplies it to the nozzle 15 via the turret 13. The cleaning liquid 7 is, for example, an aqueous cleaning liquid or a coolant. The cleaning apparatus 10 may have the cleaning liquid tank, or an external coolant device may have the cleaning liquid tank.

The moving device 14 is arranged inside the cover 11. The moving device 14 freely moves the turret 13 and the nozzle 15 with respect to the table 35 in a lateral direction (X-axis direction), a front-rear direction (Y-axis direction), and a vertical direction (Z-axis direction).

The turret 13 has a nozzle rotation axis (C-axis) 16 parallel to the Z-axis. The turret 13 may include a plurality of nozzles 15. The turret 13 pivots to select one nozzle 15. The turret 13 supplies the cleaning liquid 7 to the selected nozzle 15. The moving device 14 or the turret 13 rotates or position the nozzle 15 about the nozzle rotation axis 16 in the C-axis direction. The turret 13 has been proposed in, for example, Japanese Patent Nos. 6147623 and 5432943.

The nozzle 15 is arranged in the turret 13. The nozzle 15 is, for example, a lance, a horizontal nozzle, a straight jet nozzle, or a fan-shaped jet nozzle.

The controller 29 is a numerical controller. The controller 29 includes a hardware and a software. The hardware includes a CPU for performing various operations and the like, a storage device, a RAM, and a communication interface. The storage device is a ROM or an HDD for storing a program for executing an operation by the CPU. The RAM becomes a work area when the CPU executes the program. The communication interface is used to transmit and receive data to and from other devices. The software is stored in the storage device and executed by the CPU. Each function of the controller 29 is realized by the CPU to load in the RAM to execute various programs stored in the storage device.

The rotary table 19 and the support base 20 are disposed inside the cover 11. The table 35 is arranged on the rotary table 19 and the support base 20 so as to rotate or position about a table rotation axis 21 (A-axis direction) parallel to the X-axis. The table 35 positions and fixes the workpiece 3.

Figure 2:
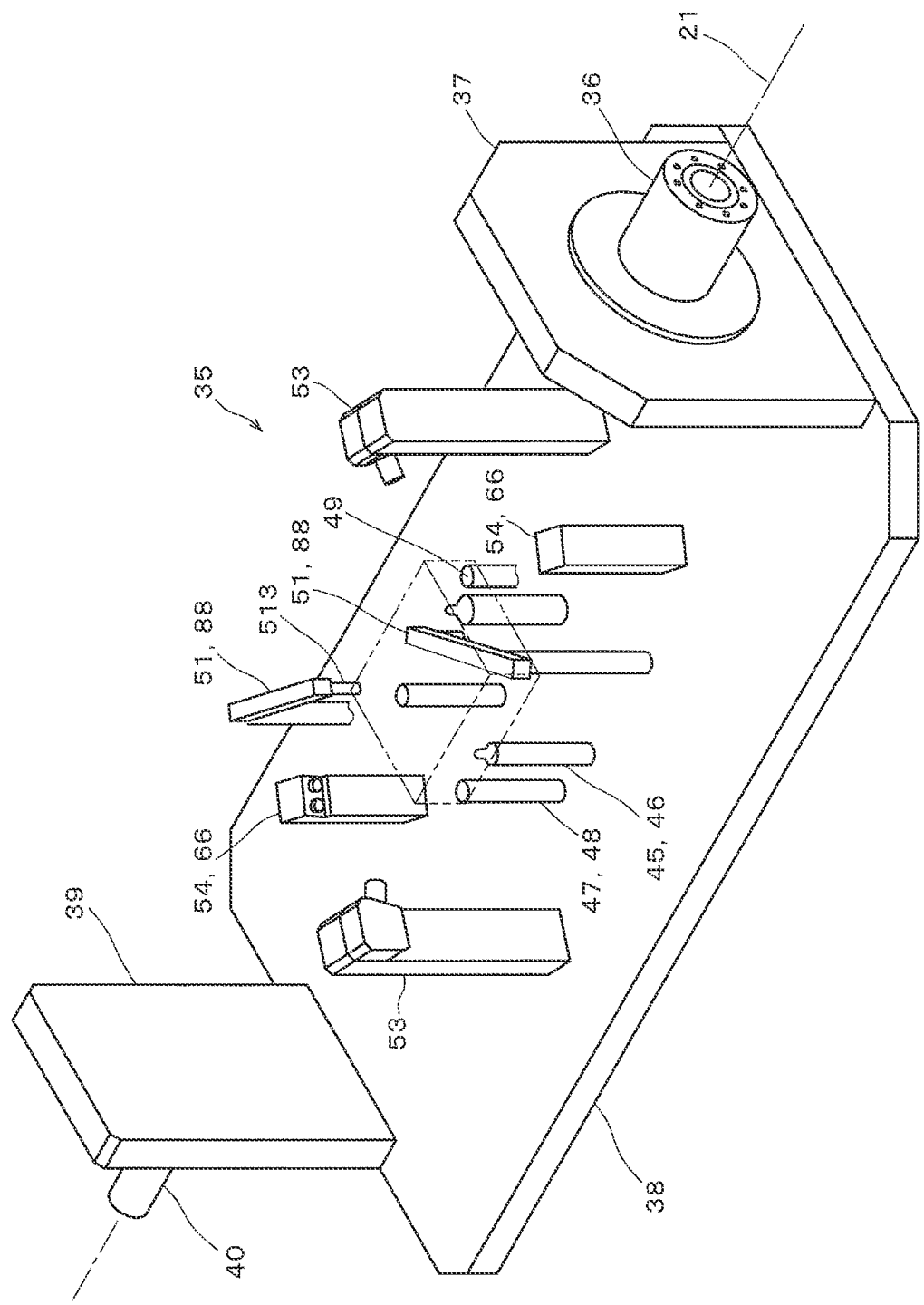
FIG. 2 is a perspective view of a table of the cleaning apparatus according to the embodiment.

As shown in FIG. 2, the table 35 includes a table plate 38, a bracket 37, a bracket 39, a swivel joint 36, a swivel joint 40, a seating pad 47, a first nozzle 48, a pin 45, a second nozzle 46, and a clamp 51. The table 35 may include a seating nozzle 49, a third nozzle 53, a fourth nozzle 54, a fifth nozzle 66, and a sixth nozzle 88.

The bracket 37 is disposed upright on the +X end of the table plate 38. The swivel joint 36 is disposed on the bracket 37. The bracket 39 is disposed upright on the −X end of the table plate 38. The swivel joint 40 is disposed on the bracket 39. The swivel joints 36, 40 are both disposed about the rotation axis 21.

The seating pad 47, the first nozzle 48, the pin 45, the second nozzle 46, the clamp 51, the third nozzle 53, the seating nozzle 49, the fourth nozzle 54, the fifth nozzle 66 and the sixth nozzle 88 are disposed on the table plate 38. The first nozzle 48 may be disposed on the seating pad 47. The second nozzle 46 may be disposed on the pin 45.

The clamp 51 is, for example, a swing clamp or a toggle clamp. The clamp 51 includes a clamp arm 511 and a hydraulic cylinder 512 (see FIG. 3). For example, the clamp arm 511 includes a clamp pad 513 at its distal end. The clamp pad 513 contacts a clamp portion 3a (described later) and presses the clamp portion 3a toward the seating pad 47.

The sixth nozzle 88 has an outlet (sixth outlet) 881. For example, the outlet 881 is disposed on the clamp pad 513. For example, immediately before the clamp arm 511 contacts the clamp portion 3a, the outlet 881 is directed toward the clamp portion 3a of the workpiece 3 installed on a seating surface 73a, which will be described later.

Figure 6:
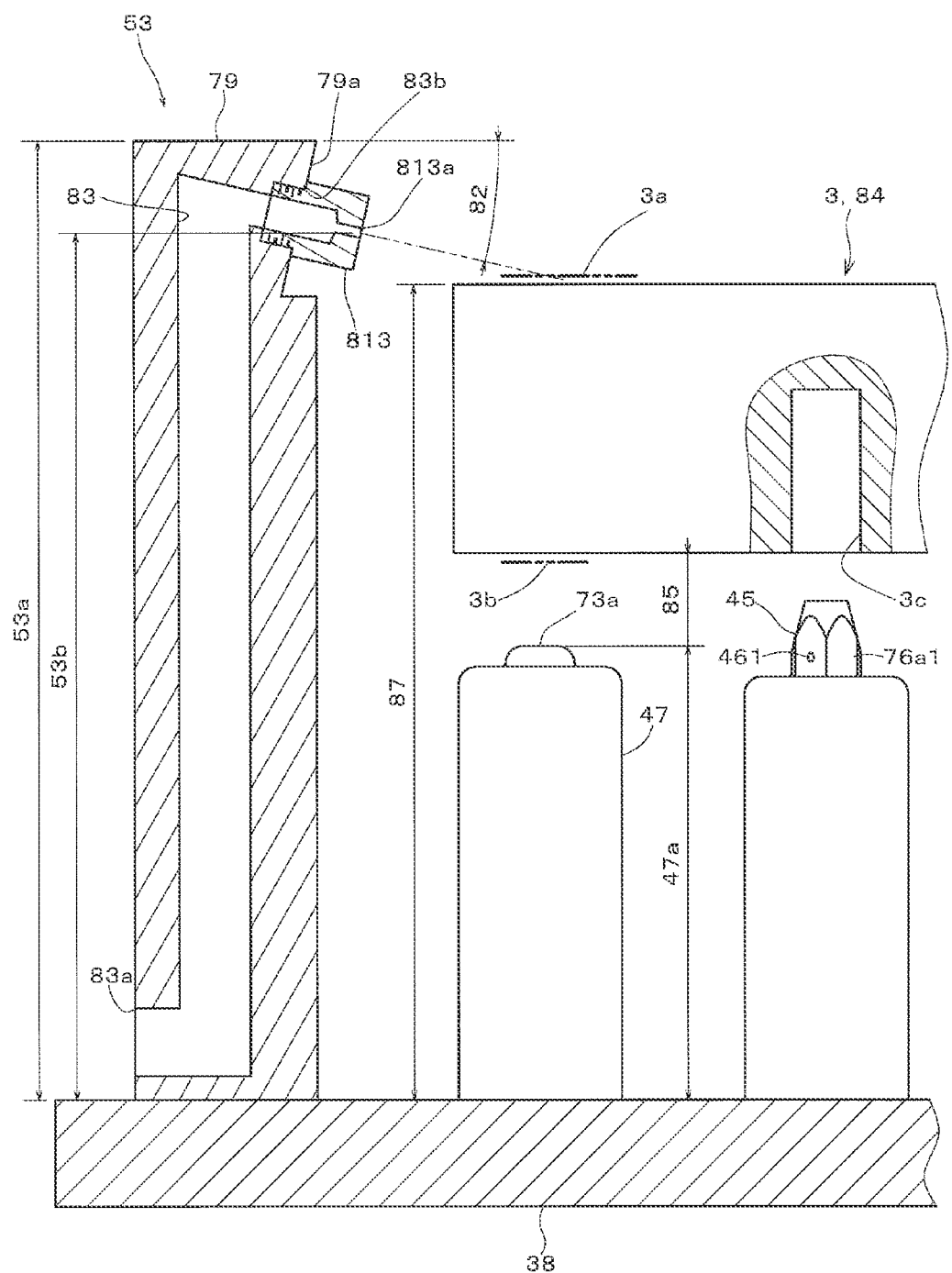
FIG. 6 is a longitudinal sectional view of a third nozzle according to the embodiment.

As shown in FIG. 6, the workpiece 3 has the clamp portion 3a, a placing portion 3b and a reference hole 3c. The clamp arm 511 presses the clamp portion 3a. The seating pads 47 contact the placing portion 3b. The pin 45 is inserted into the reference holes 3c.

Figure 3:
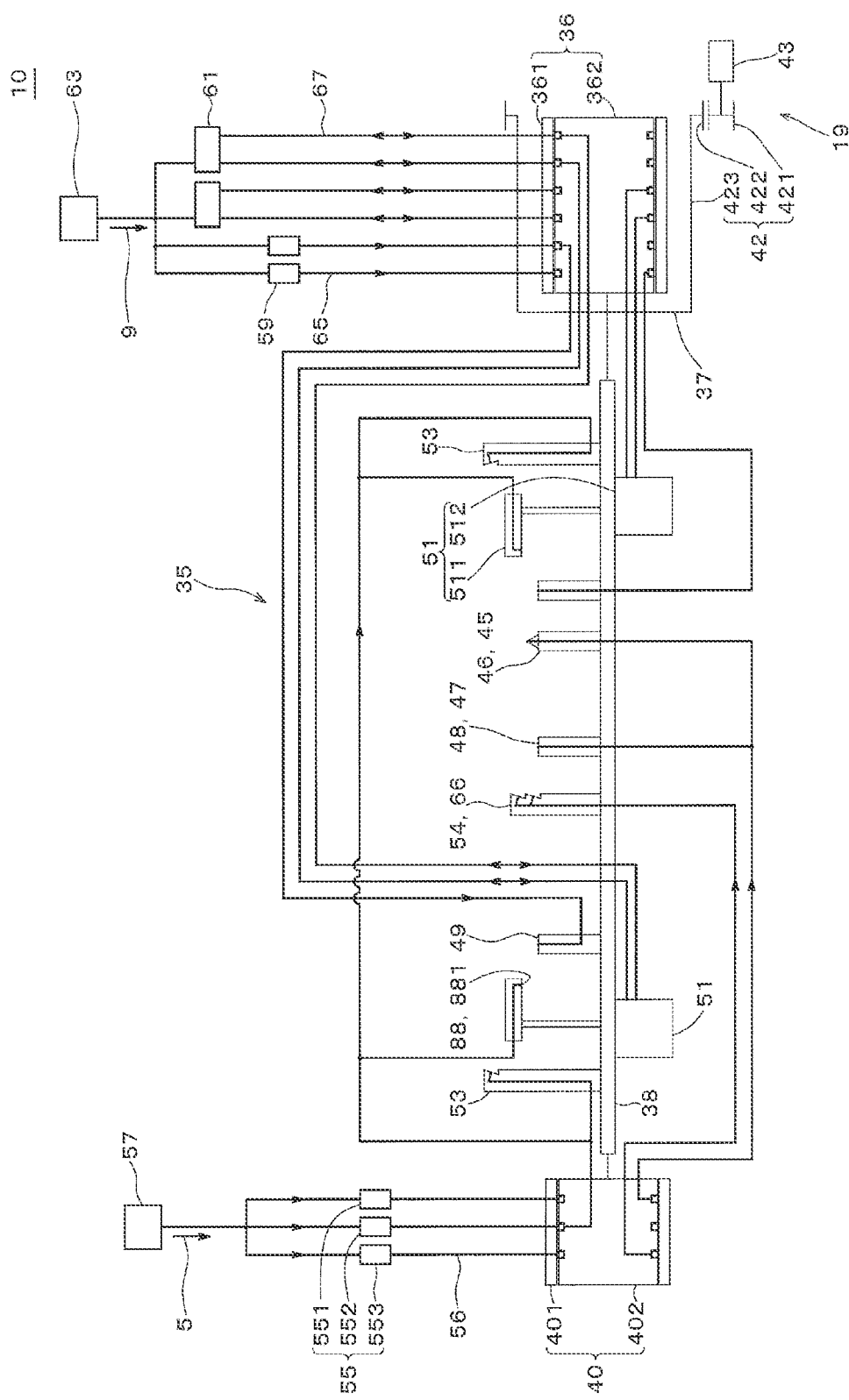
FIG. 3 shows a power transmission and hydraulic circuit of the table of the cleaning apparatus according to the embodiment.

As shown in FIG. 3, the cleaning apparatus 10 includes a compressed air source 63, a clamp valve 61, a cleaning fluid supply source 57, and a cleaning valve 55. The cleaning apparatus 10 may include a seating detector 59. The rotary table 19 includes a motor 43 and a reduction gear 42.

The reduction gear 42 has a gear 421, a gear 422 and an output shaft 423. The gear 421 is fixed to the output shaft of the motor 43. The gear 422 is fixed to the output shaft 423 and meshes with the gear 421. The output shaft 423, which is a hollow shaft, is fixed to the bracket 37. The center of the output shaft 423 becomes the rotation axis 21.

The swivel joint 36 is inserted into the interior of the output shaft 423. The swivel joint 36 includes a fixed housing 361 and a rotation shaft 362. The fixed housing 361, which is a hollow cylindrical shape, is fixed to the rotary table 19 along the rotation axis 21. The rotation shaft 362 is slidably arranged about the rotational direction inside the fixed housing 361. The rotation shaft 362 is fixed to the bracket 37. The swivel joint 36 may have one or more (six in the embodiment) channels 65, 67.

The swivel joint 40 includes a fixed housing 401 and a rotation shaft 402. The fixed housing 401 is fixed to the support base 20 along the rotation axis 21. The rotation shaft 402 is slidably arranged about the rotational direction inside the fixed housing 401. The swivel joint 40 may have one or more (three in the embodiment) channels 56.

The compressed air source 63 is, for example, a compressor. The compressed air source 63 may be disposed outside the cleaning apparatus (e.g., factory).

The seating detector 59 is connected to the seating nozzle 49 and the compressed air source 63, respectively, in the channel 65. The seating detector 59 supplies compressed air 9 having a constant pressure to the seating nozzle 49. The channel 65 passes through the swivel joint 36. When the workpiece 3 is placed on the seating pad 47, the seating nozzle 49 is closed by the workpiece 3 to increase the pressure in the channel 65. The seating detector 59 detects that the workpiece 3 is seated when the pressure of the compressed air 9 exceeds a threshold value.

The clamp valve 61, which is a directional control valve, switches a clamping operation and an unclamping operation of the clamp 51. A plurality of channels 67 pass through the swivel joint 36 to connect the compressed air source 63 and the cylinder 512.

The cleaning fluid supply source 57 is, for example, a liquid pump or a mist generator. The cleaning fluid supply source 57 may be disposed outside of the cleaning apparatus 10, e.g., an external coolant device.

The cleaning valve 55 includes a first cleaning valve 551, a second cleaning valve 552, and a third cleaning valve 553. The first to third cleaning valves 551, 552, and 553 are two-way valves. The first cleaning valve 551 connects the second nozzle 46 and the first nozzle 48 to the cleaning fluid supply source 57, respectively. The second cleaning valve 552 connects the third nozzle 53 and the sixth nozzle 88 to the cleaning fluid supply source 57. The third cleaning valve 553 connects the fourth nozzle 54 and the fifth nozzle 66 to the cleaning fluid supply source 57.

Figure 4:
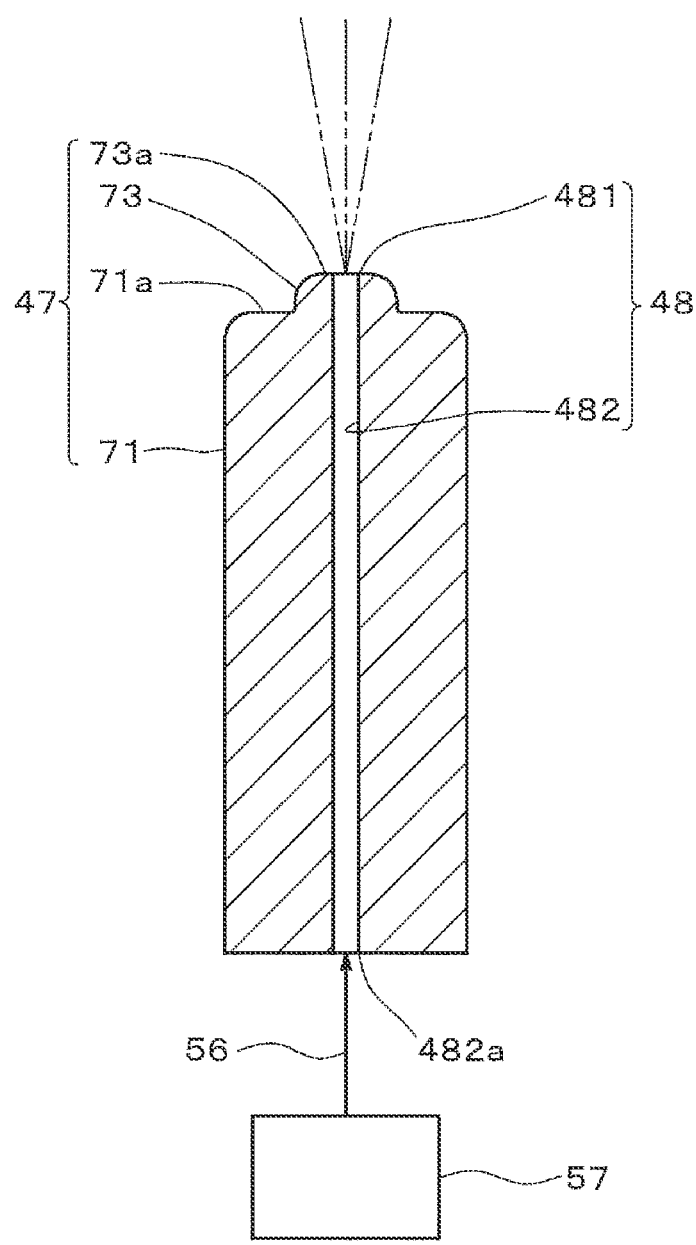
FIG. 4 is a longitudinal sectional view of a seating pad and a first nozzle according to the embodiment.

As shown in FIG. 4, the seating pad 47 includes a stem 71 and a pad portion 73. The stem 71, which has a columnar shape, supports the pad portion 73. For example, the stem 71 extends perpendicularly from the table plate 38. The stem 71 includes a shoulder 71a on its upper surface. The shoulder 71a is spaced apart from the workpiece 3. The pad portion 73 protrudes from the shoulder 71a. The pad portion 73 has a seating surface 73a on the end face. The seating surface 73a contacts the placing portion 3b of the workpiece 3. The shoulder 71a may be eliminated. That is, the side surface of the stem 71 may coincide with the side surface of the pad portion 73. The pad portion 73 and the stem 71 may be separate members.

The first nozzle 48 includes an outlet (first outlet) 481, and a channel 482. The outlet 481 is located on the seating surface 73a or the shoulder 71a. The outlet 481 is, for example, a fan-shaped jet nozzle, a straight jet nozzle, or a conical-shaped jet nozzle. Here, the fan-shaped jet nozzle ejects the cleaning fluid 5 in a fan shape on a plane. The straight jet nozzle ejects cleaning fluid 5 in a straight rod shape. The conical-shaped jet nozzle ejects the cleaning fluid 5 in a conical shape. When the outlet 481 is located on the seating surface 73a or the shoulder 71a, the outlet 481 is located along the stem 71. The outlet 481 ejects the cleaning fluid 5 along the longitudinal direction of the stem 711. The channel 482 is connected to the outlet 481. The channel 482 has an inlet port 482a located inside the stem 71. The inlet port 482a is located at the proximal end of the stem 71. The inlet port 482a is located on a bottom surface or a side surface of the stem 71. The inlet port 482a is connected to the channel 56.

Figure 5:
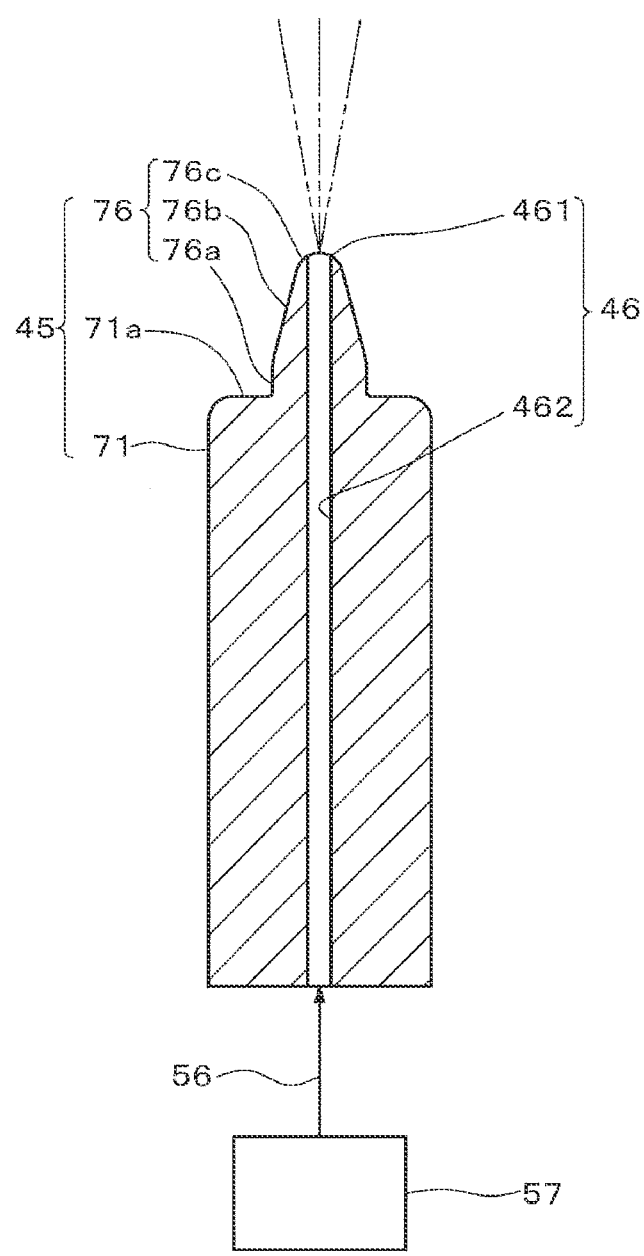
FIG. 5 is a longitudinal sectional view of a pin and a second nozzle according to the embodiment.

As shown in FIG. 5, the pin 45 includes a stem 71 and an insertion portion 76. The insertion portion 76 protrudes from the shoulder 71a. The insertion portion 76 has a cylindrical portion 76a, a guide portion 76b, and a top portion 76c. The cylindrical portion 76a is in contact with the reference hole 3c. The cylindrical portion 76a may be diamond-cut. Here, the diamond cut is a shape that the cross section of the cylindrical portion 76a leaves the cylindrical surface only at the top of the two sharp angles and other portions are cut in a diamond-shape (see FIG. 6). The guide portion 76b, which is disposed on the distal end side of the cylindrical portion 76a, has a conical surface that is tapered toward the tip. The top portion 76c is, for example, a plane perpendicular to the axis line of the cylindrical portion 76a, or a spherical. The shoulder 71a may be eliminated. That is, the side surface of the stem 71 may coincide with the side surface of the insertion portion 76. The insertion portion 76 and the stem 71 may be separate members.

The second nozzle 46 has an outlet (second outlet) 461 and a channel 462. The outlet 461 is located on the top portion 76c, the cylindrical portion 76a, or the shoulder 71a. If the outlet 461 is located on the cylindrical portion 76a, a plurality of outlets 461 may be located. The outlet 461 may be located on a cut surface 76a1 of the cylindrical portion 76a, as shown in FIG. 6. The other configuration of the outlet 461 is the same as that of the outlet 481. The channel 462 is connected to the outlet 461. The other configuration of the channel 462 is substantially identical to the channel 482.

As shown in FIG. 6, the third nozzle 53 includes a pillar 79, a nozzle tip 813, and a channel 83. The nozzle tip 813 has an outlet (third outlet) 813a. The pillar 79 is fixed to the table plate 38. The pillar 79 has a tip mounting surface 79a. The tip mounting surface 79a is disposed at the distal end of the pillar 79. The tip mounting surface 79a is inclined by an angle 82 toward the table plate 38. The angle 82 is, for example, 5 degrees to 30 degrees. The channel 83 is located inside the pillar 79. The channel 83 has an inlet port 83a and an outlet port 83b. The inlet port 83a is located, for example, on a side surface of the proximal end portion of the pillar 79. The outlet port 83b is located on the tip mounting surface 79a. The nozzle tip 813 is attached to the outlet port 83b. The nozzle tip 813 is, for example, a straight jet nozzle, a fan-shaped jet nozzle, a conical-shaped jet nozzle. Preferably, the third nozzles 53 are arranged so as to clean the clamp portion 3a while the workpiece 3 is placed on the seating surface 73a. When the workpiece 3 is in the standby position 84, the nozzle tip 81 may be positioned to clean the clamp portion 3a. Here, in the standby position 84, the workpiece 3 is spaced by the standby distance 85 from the seating surface 73a, and the pin 45 coincides with the reference hole 3c. The standby distance 85 is, for example, 1 mm to 20 mm.

The height 53a of the pillar 79 and the height 53b of the outlet 81a are equal to or higher than the height 47a of the seating surface 73a. More preferably, the height 53a and the height 53b are equal to or higher than the height of the clamp portion 3a when the workpiece 3 is placed on the seating surface 73a. The height 53a or 53b may be equal to or higher than the height 87 of the clamp portion 3a of the workpiece 3 at the standby position 84.

Figure 7:
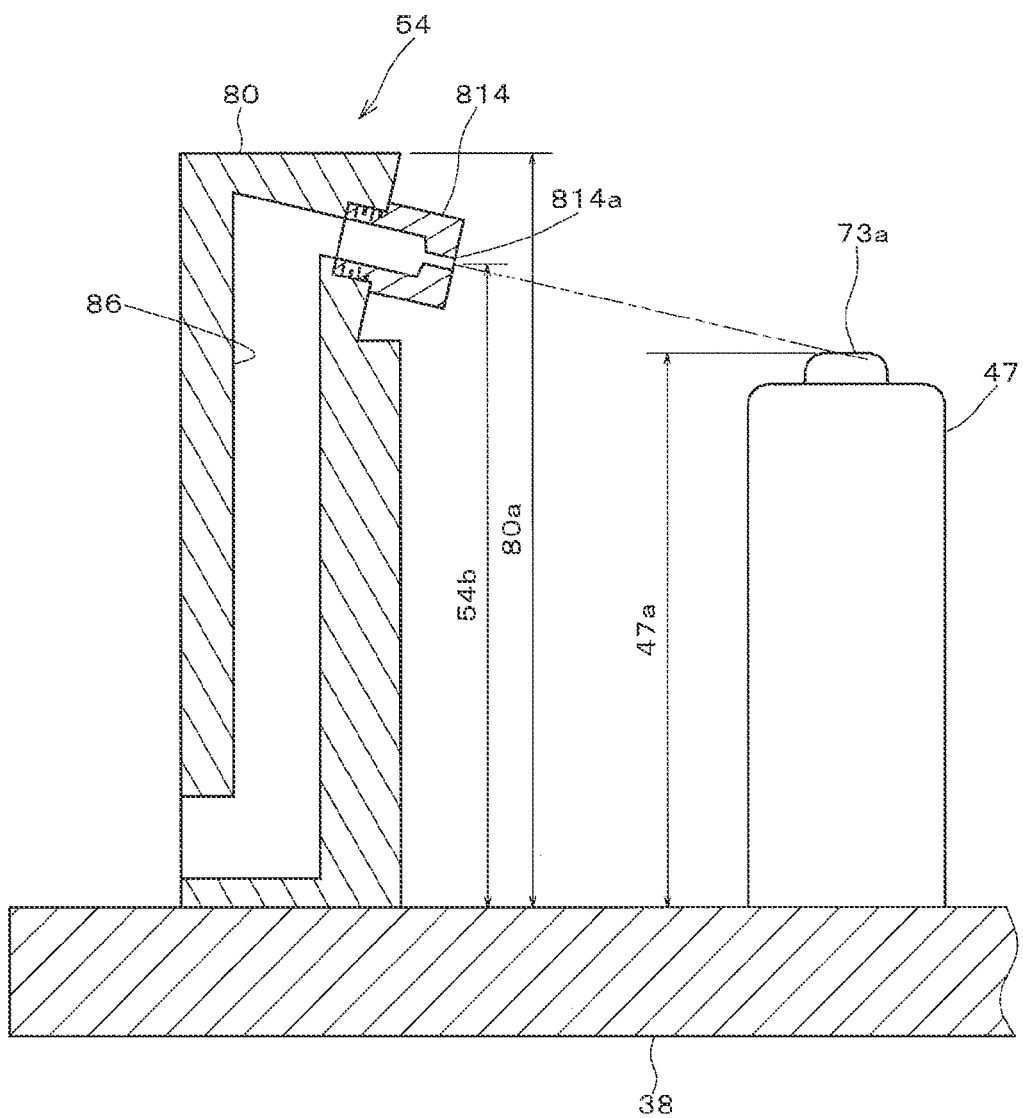
FIG. 7 is a longitudinal sectional view of a fourth nozzle according to the embodiment.

As shown in FIG. 7, the fourth nozzle 54 includes a pillar 80, a nozzle tip 814 and a channel 86. The nozzle tip 814 has an outlet (fourth outlet) 814a. The outlet 814a is directed to the seating surface 73a. The height 54b of the outlet 814a and the height 80a of the pillar 80 are equal to or higher than the height 47a of the seating surface 73a. The other configuration of the fourth nozzle 54 is substantially the same as that of the third nozzle 53.

Figure 8:
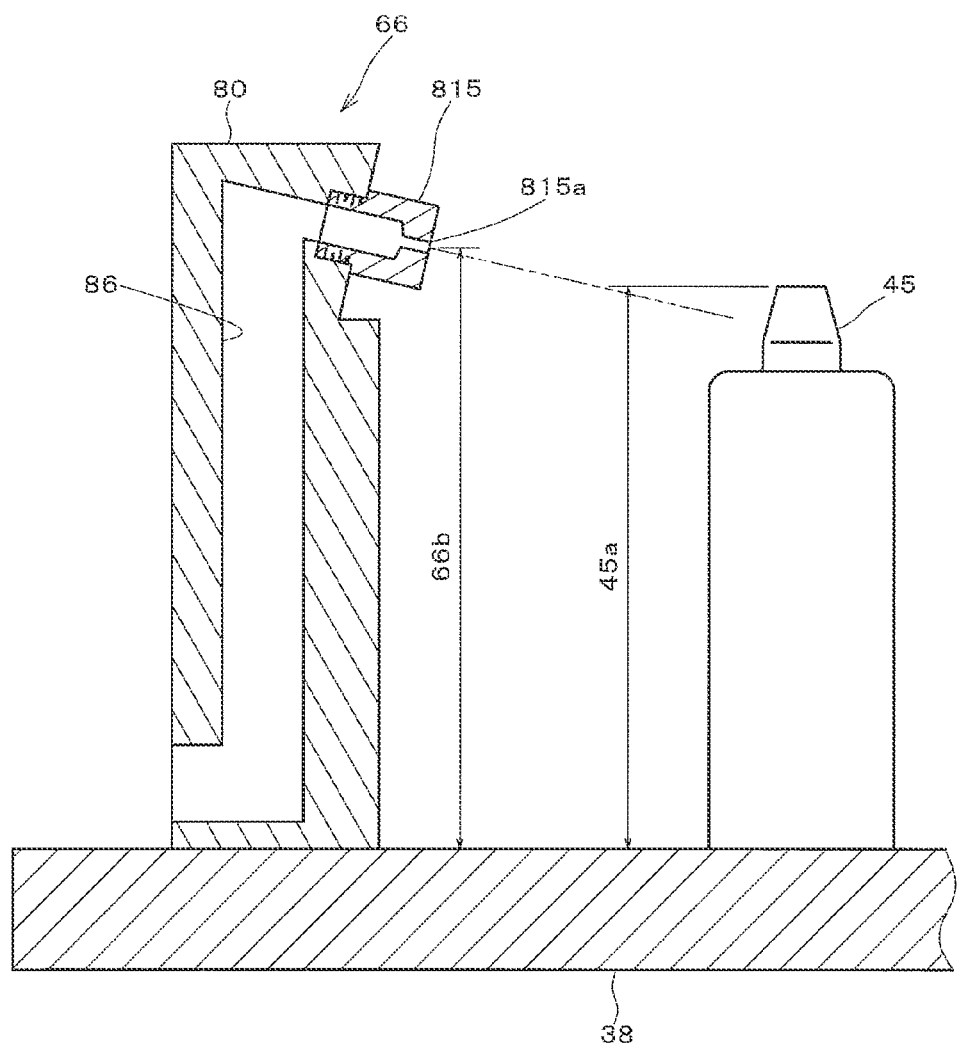
FIG. 8 is a longitudinal sectional view of a fifth nozzle according to the embodiment.

As shown in FIG. 8, the table 35 may include the fifth nozzle 66. The fifth nozzle 66 includes a nozzle tip 815. The fifth nozzle 66 and the fourth nozzle 54 may share the pillar 80 and the channel 86. The nozzle tip 815 has an outlet (fifth outlet) 815a. The outlet 815a is directed to the insertion portion 76. The height 66b of the outlet 815a and the height 80a of the pillar 80 are equal to or higher than the height 45a of the pin 45. The other configuration of the fifth nozzle 66 is substantially the same as that of the third nozzle 53.

Figure 9:
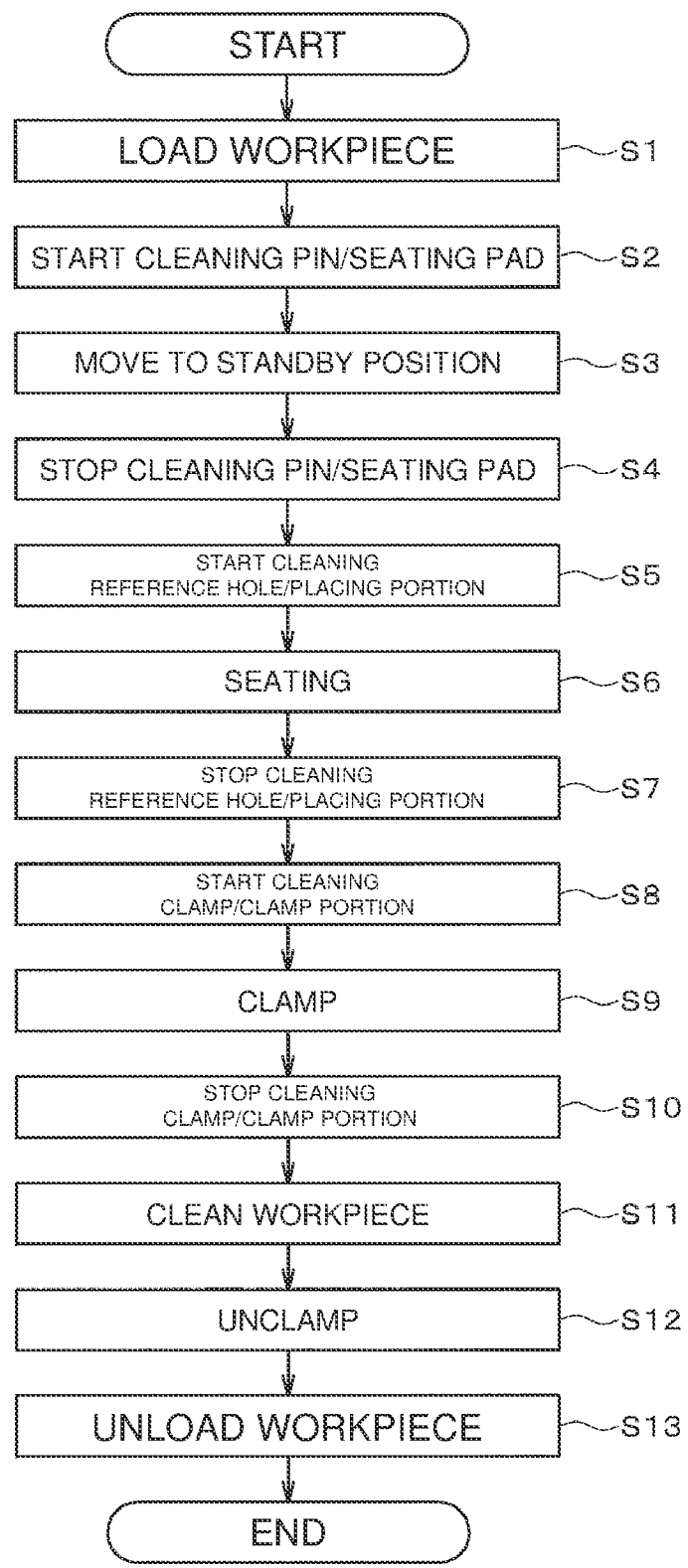
FIG. 9 is a flowchart showing a cleaning method of the embodiment.

The cleaning method according to the embodiment will be described with reference to FIG. 9. In step S1, a robot or an operator carries the workpiece 3 inside the cover 11. The cleaning apparatus 10 then opens the third cleaning valve 553. In step S2, the fourth nozzle 54 cleans the seating surface 73a and the fifth nozzle 66 cleans the insertion portion 76. In step S3, the workpiece 3 moves to the standby position 84. In step S4, The cleaning apparatus 10 closes the third cleaning valve 553 to stop the ejection of cleaning fluid 5 from the fourth nozzle 54 and the fifth nozzle 66.

In step S5, the cleaning apparatus 10 opens the first cleaning valve 551 to eject the cleaning fluid 5 from the first nozzle 48 and the second nozzle 46. The placing portion 3b and the reference hole 3c are cleaned by the jet of the cleaning fluid 5 colliding with the inner surface of the placing portion 3b and the reference hole 3c. The workpiece 3 is then placed on the seating surface 73a. Then, in step S6, the seating detector 59 detects that the workpiece 3 is seated on the seating surface 73a. In step S7, the cleaning apparatus 10 closes the first cleaning valve 551 to stop the ejection of the first nozzle 48 and the second nozzle 46.

Next, in step S8, the cleaning apparatus 10 opens the second cleaning valve 552 to ejects the cleaning fluid 5 from the third nozzle 53 and the sixth nozzle 88. The jet of the cleaning fluid 5 collides with the clamp portion 3a to clean the clamp portion 3a. In step S9, the cleaning apparatus 10 switches the clamp valve 61 to fix the workpiece 3 to the table 35 by the clamp 51. When the clamp arm 511 approaches the clamp portion 3a, a jet of the cleaning fluid 5 collides with the clamp arm 511 to clean the clamp arm 511. Thereafter, in step S10, the cleaning apparatus 10 closes the second cleaning valve 552 to stop the ejection of the third nozzle 53 and the sixth nozzle 88.

In step S11, the cleaning apparatus 10 then cleans the workpiece 3. Specifically, firstly, the cleaning liquid 7 is ejected from the nozzle 15. The cleaning apparatus 10 moves the nozzle 15 by the moving device 14 to collide the jet generated from the nozzle 15 with the workpiece 3. Then, the jet cleans the surface of the workpiece 3.

In step S12, the clamp 51 unclamps the workpiece 3. Finally, in step S13, the robot or the operator carries out the workpiece 3 to the outside of the cover 11.

Note that steps S2, S4, S8, and S10 may be eliminated. Any two or more of steps S2, S5, and S8 may be executed simultaneously. Any two or more of steps S4, S7 and S10 may be performed simultaneously.

The present invention is not limited to the embodiments described above, and various modifications can be made without departing from the gist of the present invention, and all technical matters included in the technical idea described in the claims are the subject matter of the present invention. While the foregoing embodiments illustrate preferred examples, those skilled in the art will appreciate that various alternatives, modifications, variations, or improvements may be made in light of the teachings disclosed herein and are within the scope of the appended claims.

REFERENCE SIGNS LIST

3 Workpiece
5 Cleaning fluid
3b Placing portion
3c Reference hole
10 Cleaning apparatus
38 Table plate
45 Pin
46 Second nozzle
47 Seating pad
48 First nozzle
54 Fourth nozzle
51 Clamp
53 Third nozzle

What is claimed is:

1. A cleaning apparatus for cleaning a workpiece having a placing portion and a reference hole, the cleaning apparatus comprising:
   a table plate;
   a seating pad disposed on the table plate, the workpiece configured to be placed on the seating pad at the placing portion, the seating pad including a first nozzle disposed at a distal end of the seating pad, the first nozzle configured to eject a cleaning fluid toward the placing portion; and
   a pin disposed on the table plate, the pin configured to be inserted into the reference hole, the pin including a second nozzle configured to eject the cleaning fluid toward inside of the reference hole.

2. The cleaning apparatus according to claim 1, wherein the seating pad includes a seating surface, and
   the first nozzle includes a first outlet located on the seating surface.

3. The cleaning apparatus according to claim 1, wherein the pin includes
   a cylindrical portion, and
   a tapered guide portion, and
   the second nozzle includes a second outlet located on the cylindrical portion.

4. The cleaning apparatus according to claim 1, wherein the pin includes
   a cylindrical portion, and
   a tapered guide portion having a top portion, and
   the second nozzle includes a second outlet located on the top portion.

5. The cleaning apparatus according to claim 1, further comprising:
   a clamp disposed on the table plate, the clamp including a clamp arm configured to contact a clamp portion of the workpiece, the clamp configured to fix the workpiece; and
   a third nozzle configured to eject the cleaning fluid toward the clamp portion.

6. The cleaning apparatus according to claim 5, wherein the third nozzle includes
   a pillar extending from the table plate, and
   a third outlet located at a distal end portion of the pillar.

7. The cleaning apparatus according to claim 6, wherein the third outlet is inclinedly arranged toward the table plate.

8. The cleaning apparatus according to claim 2, wherein the pin includes
   a cylindrical portion, and
   a tapered guide portion, and
   the second nozzle includes a second outlet located on the cylindrical portion.

9. The cleaning apparatus according to claim 2, wherein the pin includes
   a cylindrical portion, and
   a tapered guide portion having a top portion, and
   the second nozzle includes a second outlet located on the top portion.

10. The cleaning apparatus according to claim 2, further comprising:
    a clamp disposed on the table plate, the clamp including a clamp arm configured to contact a clamp portion of the workpiece, the clamp configured to fix the workpiece; and
    a third nozzle configured to eject the cleaning fluid toward the clamp portion.

11. The cleaning apparatus according to claim 3, further comprising:
    a clamp disposed on the table plate, the clamp including a clamp arm configured to contact a clamp portion of the workpiece, the clamp configured to fix the workpiece; and
    a third nozzle configured to eject the cleaning fluid toward the clamp portion.

12. The cleaning apparatus according to claim 4, further comprising:
    a clamp disposed on the table plate, the clamp including a clamp arm configured to contact a clamp portion of the workpiece, the clamp configured to fix the workpiece; and
    a third nozzle configured to eject the cleaning fluid toward the clamp portion.

13. A cleaning apparatus for cleaning a workpiece having a placing portion, the cleaning apparatus comprising:
    a table plate;
    a seating pad disposed on the table plate, the workpiece configured to be placed on the seating pad at the placing portion, the seating pad including a first nozzle disposed at a distal end of the seating pad, the first nozzle configured to eject a cleaning fluid toward the placing portion;
    a clamp disposed on the table plate, the clamp including a clamp arm configured to contact a clamp portion of the workpiece, the clamp configured to fix the workpiece; and
    a third nozzle configured to eject the cleaning fluid toward the clamp portion.

* * * * *